Oct. 13, 1931.   F. A. KOWARICK   1,827,661
MEANS FOR LUBRICATING THE PISTON OF ENGINES
Filed Jan. 9, 1929
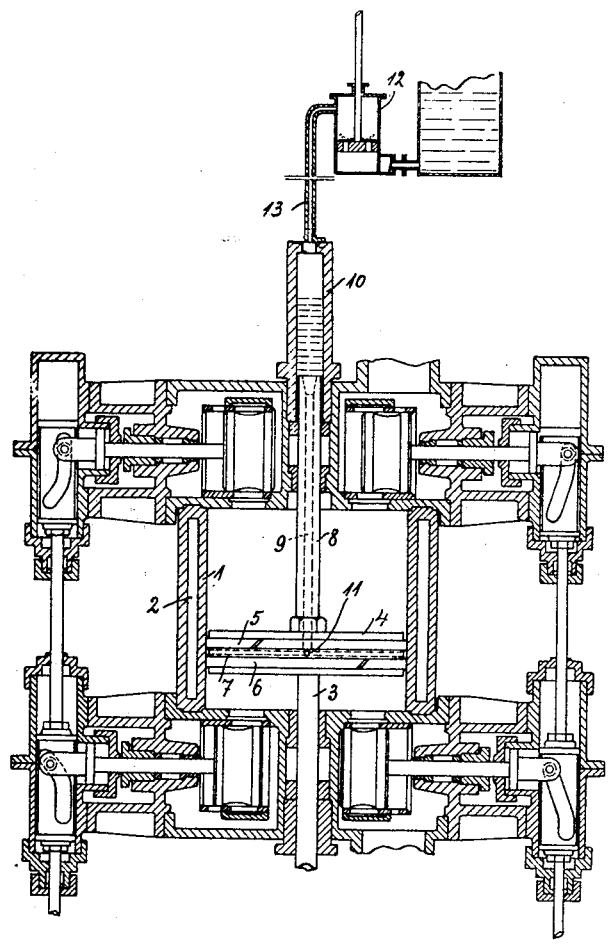

Patented Oct. 13, 1931

1,827,661

UNITED STATES PATENT OFFICE

FREDERICO ANTON KOWARICK, OF SAO PAULO, BRAZIL

MEANS FOR LUBRICATING THE PISTON OF ENGINES

Application filed January 9, 1929, Serial No. 331,262, and in Germany January 16, 1928.

High speed engines, particularly piston steam engines working with high superheated steam, for instance up to 400° to 450° C. and a starting pressure of 100 atm, and also running at highest piston speed require special precautionary measures for lubricating the piston to prevent inner destruction by friction, and this is the more necessary since under the prevailing circumstances there is no condensation of steam within the cylinder and thus no moistening of the walls of the cylinder. These difficulties are still increased in multiple expansion steam engines, in which all cylinders are surrounded by a heating mantle, so that they are continuously subjected to a high temperature which together with a speed of the piston of 6 to 12 m. in the second makes a specially careful lubrication necessary. The method of lubricating the cylinder walls of piston now-a-days usually made use of, that is to say introducing a lubricant into the working steam would completely fail.

The matter of the invention is a lubrication of the piston which automatically applies the necessary lubricant to the place or face wherever the piston is working at the time. The means for carrying this out consists therein that the piston rod is prolonged beyond the piston, and that the prolongation has a longitudinal bore which reaches into the piston and communicates by channels with a circumferential groove on the piston, and that the end of the prolongation projects continuously into a casing mounted on the cylinder cover, which casing is connected with a compression pump for the lubricant.

In the drawing the cylinder is shown together with the valve casings and one part of the valve gear in vertical section.

Within the cylinder 1, which is surrounded by a hollow space 2 forming one part of a general receiver, a piston 4 at the end of a piston rod 3 is adapted to reciprocate. The piston 4 is provided on its circumference beside with the usual piston rings 5 and 6 with a circumferential groove 7. The piston rod 3 has an upper prolongation 8 provided with an inner bore 9 conically expanded at the upper end and projecting within the piston 4 and here communicating with the circumferential groove 7 by a plurality of preferably radial channels 11. The upper end of the prolongation 8 continuously projects into a casing 10 mounted on the cylinder cover and partly filled with a lubricant. This casing is connected with a pressure pump 12 for the lubricant, for instance by the pipe 13. This pump enables the casing 10 to be filled up when found necessary. In the upper stroke of the piston the air present in the casing 10 is compressed the amount of which air may be regulated. By the compression described the oil or other lubricant will be pressed by way of the longitudinal bore and the channels 11 into the circumferential groove 7, thus being taken along by the piston rings 5 and 6 in a thin film. On the downward stroke of the piston the expansion of the compressed air acts in similar manner as well as the adhesion power and the inertia of the oil. Therefore the automatic direct lubrication of the working faces of the piston rings results.

I claim:—

1. Means for lubricating the piston of engines, more particularly high pressure steam engines, comprising a prolongation of the piston rod beyond the piston, a longitudinal bore in the said prolongation, which bore projects into the piston itself, piston rings on said piston, a circumferential groove on the piston intermediate the said piston rings, and channels for connecting the said longitudinal bore with the said circumferential groove, a casing mounted on the cover of the cylinder into which casing the said prolongation of the piston rod is adapted to project, said casing forming an air chamber and being partially filled with lubricant which is adapted to enter the longitudinal bore by way of the said channels into the circumferential groove of the piston on the upward stroke of said piston owing to the air pressure created thereby in the casing whereby lubricant will also be supplied upon the downward stroke of said piston due to the compressed air expanding in said casing.

2. Means for lubricating the piston of engines, according to claim 1, in which the said casing for the prolongation of the piston rod communicates with lubricant replenishing means.

In testimony whereof I have signed my name to this specification.

FREDERICO ANTON KOWARICK.